US005172135A

United States Patent [19]

Creagh et al.

[11] Patent Number: 5,172,135

[45] Date of Patent: Dec. 15, 1992

[54] HOT MELT INK SUPPLY UNIT

[75] Inventors: Linda T. Creagh, West Lebanon, N.H.; Charles W. Spehrley, Jr., Hartford; Nathan P. Hine, Norwich, both of Vt.; Dean H. Cranston, Lebanon, N.H.; Jack B. MacDonald, Dedham, Mass.

[73] Assignee: Spectra, Inc., Hanover, N.H.

[21] Appl. No.: 674,704

[22] Filed: Mar. 25, 1991

Related U.S. Application Data

[60] Division of Ser. No. 379,918, Jul. 14, 1989, Pat. No. 5,003,322, which is a division of Ser. No. 303,971, Feb. 1, 1989, Pat. No. 4,864,330, which is a continuation of Ser. No. 94,661, Sep. 9, 1987, abandoned.

[51] Int. Cl.[5] .......... G01D 15/16

[52] U.S. Cl. .......... 346/1.1; 346/140 R

[58] Field of Search .......... 346/140, 1.1; 400/126

[56] References Cited

U.S. PATENT DOCUMENTS

| | | | |
|---|---|---|---|
| 2,480,899 | 4/1946 | Bond | 249/142 |
| 2,946,207 | 7/1960 | Hulterstrum | 249/121 |
| 4,593,292 | 6/1986 | Lewis | 346/140 R |
| 4,631,557 | 12/1986 | Cooke et al. | 346/140 R |
| 4,636,803 | 1/1987 | Mikalsen | 346/140 R |
| 4,667,206 | 5/1987 | De Young | 346/140 R |
| 4,739,339 | 4/1988 | De Young et al. | 346/1.1 |
| 4,823,146 | 4/1989 | Cooke et al. | 346/1.1 |
| 4,941,018 | 7/1990 | Kasamura et al. | 355/245 |

*Primary Examiner*—Mark J. Reinhart

*Attorney, Agent, or Firm*—Brumbaugh, Graves, Donohue & Raymond

[57] ABSTRACT

In the embodiment of the hot melt ink supply unit described in the specification, a block of solid hot melt ink has a peripheral surface formed with a key configuration and a handle is removably connected to the block by a threaded projection. After insertion of the block into a correspondingly keyed opening in a heated reservoir, the handle is turned to separate the handle portion from the block of solid ink. A container provided with a removable seal encloses the block of solid ink and handle to protect the ink from contamination.

7 Claims, 1 Drawing Sheet

HOT MELT INK SUPPLY UNIT

REFERENCE TO RELATED APPLICATIONS

This application is a division of application Ser. No. 07/379,918, filed Jul. 14, 1989, now U.S. Pat. No. 5,003,322, which is a division of application Ser. No. 07/303,971, filed Feb. 1, 1989, now U.S. Pat. No. 4,864,330, which was a continuation of application Ser. No. 07/094,661, filed Sep. 9, 1987, now abandoned.

BACKGROUND OF THE INVENTION

This invention relates to arrangements for storing and supplying unit quantities of hot melt ink for use in hot melt ink printing systems and, more particularly, to a new and improved hot melt ink supply unit which effectively protects the hot melt ink during storage and transit and permits delivery of the ink in a simple and convenient manner to a molten ink reservoir without contamination.

In printing systems which use inks that are solid at room temperature and melted by heating for application to an ink-receiving substrate, such as certain ink jet printing systems, the solid ink must be delivered to a molten ink reservoir associated with the printing system in such a way that contamination of the ink is avoided. In addition, where different colored inks are contained in different reservoirs in the printing system, care must be taken to assure that ink of the proper color is delivered to the corresponding reservoir. Furthermore, exposure of the operator to molten ink splashed from the reservoir when solid ink is delivered must be avoided.

Heretofore, hot melt ink has been supplied to reservoirs in ink jet systems by selective heating of ink in a replaceable cartridge as described, for example, in U.S. Pat. No. 4,631,557, by selective heating of an ink block as described in U.S. Pat. No. 4,593,292, or by advancing ink pellets or granules toward the reservoir by a complex pellet drive or granule conveyer system as described in U.S. Pat. Nos. 4,636,803 and 4,667,206. Those arrangements, however, require either melting of the ink in a cartridge or block outside the reservoir to transfer ink into the reservoir or necessitate complicated mechanical advancing and delivery systems to move pellets or granules from a supply into a reservoir. Thus, the prior art does not permit simple and convenient manual loading of individual solid hot melt ink supply units without exposing the solid ink to potential contamination and the operator to possible injury from splashing of molten ink in the reservoir.

SUMMARY OF THE INVENTION

Accordingly, it is an object of the present invention to provide a new and improved hot melt ink supply unit which overcomes the above-mentioned disadvantages of the prior art.

Another object of the present invention is to provide a hot melt ink supply unit arranged for convenient and efficient manual delivery of measured quantities of solid hot melt ink to a reservoir while avoiding contamination of the ink and danger to the operator.

These and other objects of the invention are attained by providing a block of solid hot melt ink having a keyed peripheral configuration and a handle member removably affixed to the block of hot melt ink and separable therefrom by relative rotation with respect to the block. In a preferred embodiment the handle member is formed with a splash guard covering the adjacent surface of the hot melt ink block and a container conforming to the keyed peripheral surface of the hot melt ink block and encloses both the ink block and the handle member to provide a convenient package for transportation and storage.

BRIEF DESCRIPTION OF THE DRAWINGS

Further objects and advantages of the invention will be apparent from a reading of the following description in conjunction with the accompanying drawings in which.

DESCRIPTION OF PREFERRED EMBODIMENT

Figure 1:
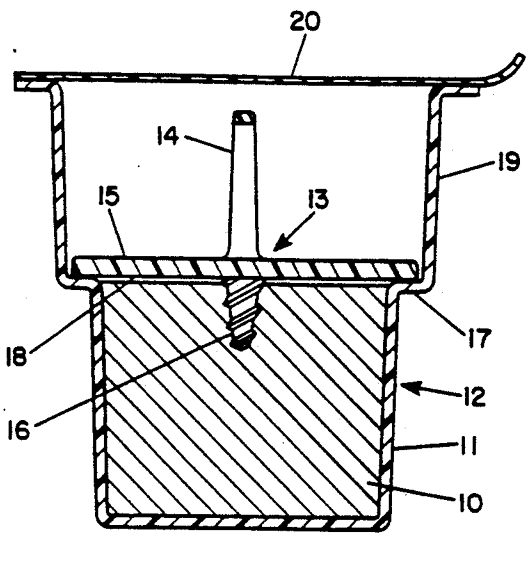
FIG. 1 is a transverse cross-sectional view illustrating a representative embodiment of a hot melt ink supply unit and container arranged in accordance with the present invention.

In the representative embodiment of a hot melt ink supply unit in accordance with the invention shown in FIG. 1, a solid block 10 of hot melt ink is disposed in the lower portion 11 of a cup-shaped container 12. A handle member 13 consisting of an upwardly projecting handle 14, a disc-shaped splash guard 15 and a threaded central projection 16 is seated on a shoulder 17 in the wall of the cup-shaped container 12. The shoulder 17 is located and handle member 13 is formed so that the projection 16 extends downwardly a short distance into the solid ink block 10 disposed in the lower portion of the container and a narrow space 18 separates the top of the block 10 and the splash guard 15. The handle member 13 may be made of any material, such as plastic or metal, to which the ink block 10 does not strongly adhere.

In order to provide a releasable connection between the ink block 10 and the handle member 13 by means of the threaded projection 16 while maintaining a space 18 between the ink block and the splash guard 15 in a convenient manner, a measured quantity of the ink is preferably introduced into the lower portion 11 of the container 12 in molten form so as to reach a level just below the shoulder 17 and the handle member 14 is positioned with the projection 16 inserted into the molten ink and the splash guard 15 resting on the shoulder 17, after which the ink is solidified.

In a typical arrangement for holding 20 cc of solid ink, the lower portion 11 of the container is approximately 1.25 inch in diameter and the shoulder 17 is approximately 1.00 inch from the bottom of the container. To facilitate separation of the handle member 13 from the ink block, the threaded projection, which is tapered by about 10°, extends approximately 0.25 inch into the ink block and the thread on the projection is at an angle of about 45° to the axis of the projection.

To avoid the possible introduction of contaminants into the container 12 during storage and shipment, the container includes an upper portion 19 which surrounds the handle member 13 and the opening at the top of the cup-shaped container is sealed by a layer 20 of plastic sheet material which may be peeled off when the ink supply unit is to be removed and used. Preferably, the container 12 is made of transparent or translucent plastic material and the wall of at least the lower portion 11 is shaped with a slight taper, for example, 2°, to facilitate removal of the block of solid ink. In addition, the material of which the container is made should have a low adherence to the ink and should preferably be slightly resilient to facilitate separation of the ink block from the container.

Figure 2:
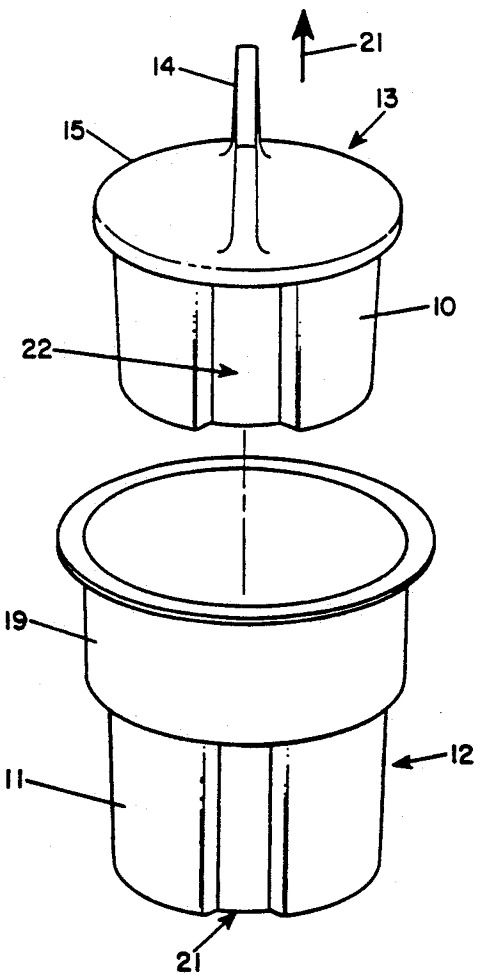
FIG. 2 is a perspective view illustrating the hot melt ink supply unit of FIG. 1 partially removed from the container.

The ink supply unit is removed from the container 12 by separating the sealing sheet 20 and pulling upwardly on the handle 14 without twisting while holding the container, as indicated by the arrow 21 in FIG. 2. As shown in FIG. 2, the lower portion 11 of the container 12 has a keyed peripheral configuration which, in the illustrated embodiment, consists of a recess 21 having a specific angular extent, such as 30°. As a result, a correspondingly shaped recess 22 is formed in the block 10 to provide a keyed shape which can be received in a correspondingly keyed opening in the reservoir which is to receive the ink block. By providing a different key configuration for each color of ink, and correspondingly different key configurations for the ink reservoirs, the possibility of supplying ink of the wrong color to a reservoir is positively prevented. For example, two or more recesses narrower than the recess 21 may be provided at differing peripheral angles in other ink supply units so that none of them can be received in the reservoir opening conforming to any other key configuration.

Figure 3:
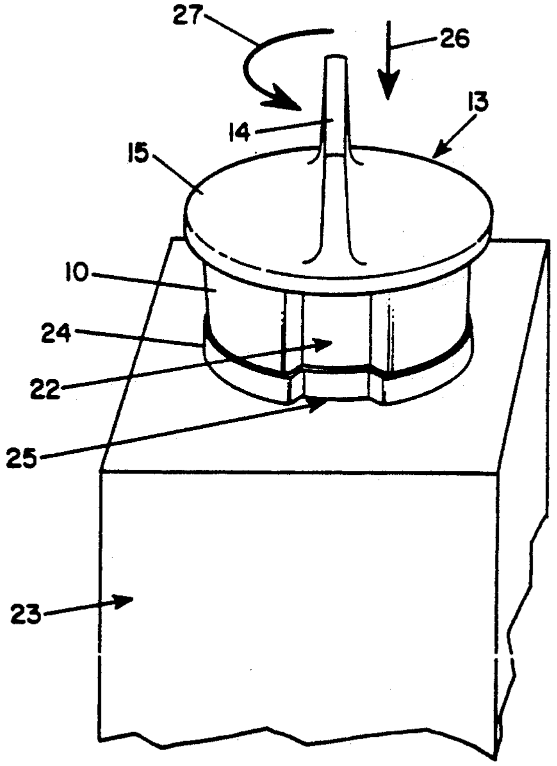
FIG. 3 is a perspective view illustrating the manner in which the hot melt ink supply unit of FIG. 1 is inserted into a typical molten ink reservoir and separated from the handle member.

In FIG. 3, a heated reservoir portion 23 of a hot melt ink printing system, which may contain molten hot melt ink, is illustrated schematically. The reservoir 23 has an ink-receiving opening provided with a collar 24 which is formed with a key comprising an inward projection 25 corresponding in shape to the recess 22 providing the key in the periphery of the block of hot melt ink 10. To supply the ink block 10 to the reservoir after removal from the container 12, the recess 22 in the block is aligned with the inward projection 25 of the collar and the combined block and handle member are inserted downwardly into the reservoir in the direction of the arrow 26 in FIG. 3. When the splash guard 15 engages the top of the collar 24, the handle 14 is rotated in the counterclockwise direction as indicated by the arrow 27 so that the threaded portion 16 is turned to unscrew it from the block 10 while the block 10 is held in angularly fixed position. Preferably, the screw connection is designed so that approximately one-quarter turn of the handle is sufficient to release the handle member from the block of solid ink.

Since the splash guard 15 is held against the collar 24 during rotation, the angle of the thread on the projection 16 moves the block 10 downwardly as the handle is turned. Consequently, after the block 10 is disconnected from the handle member, it drops into the molten ink in the reservoir and the operator is protected from any resulting splash of the molten ink by the splash guard 15 which completely covers the opening in the collar 24. Thereafter, the reservoir opening may be closed by a cover (not shown) to avoid contamination of the ink in the reservoir.

Thus, the packaging, storage, transportation and removal of a block of hot melt ink and insertion of the hot melt ink into a reservoir containing molten ink is conveniently accomplished while avoiding contamination of the ink and danger to the operator from the hot melt ink in the reservoir.

Although the invention has been described herein with reference to a specific embodiment, many modifications and variations therein will readily occur to those skilled in the art. For example, the connection between the handle member and the block of hot melt ink, rather than being a single central threaded projection from the handle, might consist of several projections extending downwardly from the splash guard into the block at locations spaced from the center and into the ink block at an angle so that they are withdrawn from the block upon rotation of the handle. Accordingly, all such variations and modifications are included within the intended scope of the invention as defined by the following claims.

We claim:

1. A hot melt ink system comprising a block of hot melt ink having a selected shape, handle means having a portion engaging a portion of the block of hot melt ink and removable therefrom upon relative angular motion between the engaged portions of the handle means and the ink block, reservoir means for melting solid blocks of hot melt ink, and receiving means shaped in accordance with the selected shape of the hot melt ink block to engage the block of hot melt ink to be introduced into the reservoir and restrain angular motion of the block to permit relative angular motion between the engaged portions of the handle means and the ink block.

2. A hot melt ink system according to claim 1 wherein the block of hot melt ink and the receiving means are shaped to restrain rotation of the block about an axis parallel to the direction of introduction of the block into the reservoir and the handle means is removable from the block by rotation about that axis.

3. A method of forming a hot melt ink supply unit comprising providing a molding member shaped with a keying surface, introducing molten hot melt ink into the molding member, supporting a handle member with a portion extending into the molten hot melt ink which is releasable from the ink after solidification by relative motion with respect to the solidified ink while the solidified ink is retained by a surface formed by the keying surface, solidifying the hot melt ink and providing a sealed enclosure to contain the handle member in the hot melt ink to prevent contamination thereof during storage and shipment.

4. A method according to claim 3 wherein the handle member includes splashguard means adjacent to the block of hot melt ink and including supporting the splashguard means in spaced relation from the hot melt ink while the hot melt ink is being solidified.

5. A hot melt ink system comprising a plurality of reservoirs for hot melt ink of different colors, ink receiving means for each of the reservoirs having an opening, the configuration of the opening being different for each of the reservoirs, and a plurality of blocks of hot melt ink of different colors having different peripheral configurations arranged to be received only in a corresponding one of the openings in the receiving means for the reservoirs to prevent ink of the wrong color from being supplied to a reservoir.

6. For use in a hot melt ink system having a plurality of reservoirs for different colored inks with openings having different peripheral shapes, a plurality of blocks of solid hot melt ink of different colors, each block having a different peripheral configuration from that of a block of a different color ink.

7. A set of hot melt inks according to claim 6 wherein the peripheral configurations of the ink blocks include projections and recesses with differing angular extent.

* * * * *